W. T. DAVIS.
GOVERNOR FOR STEAM ENGINES.
APPLICATION FILED MAY 18, 1909.
1,012,611.
Patented Dec. 26, 1911.
2 SHEETS—SHEET 1.
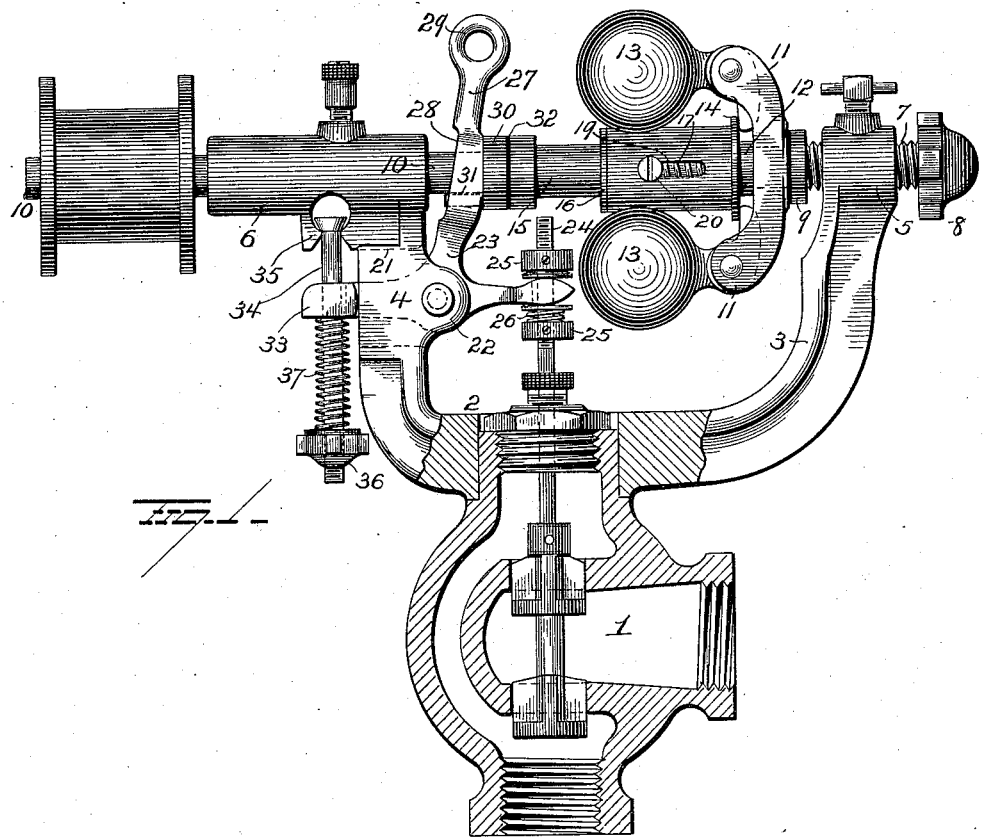
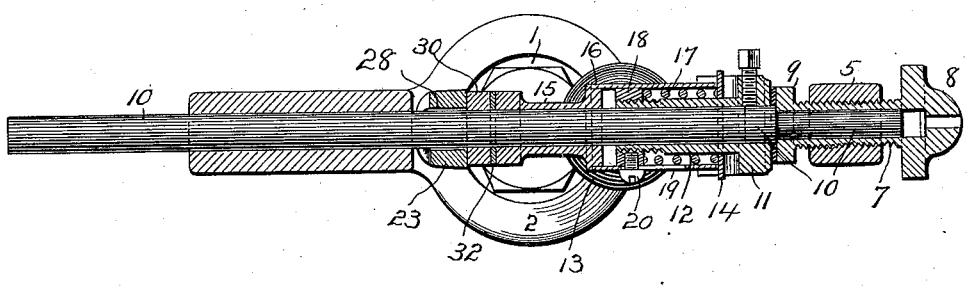
WITNESSES
INVENTOR
W. T. Davis
By H. A. Seymour
Attorney W. T. DAVIS.
GOVERNOR FOR STEAM ENGINES.
APPLICATION FILED MAY 18, 1909.
1,012,611.
Patented Dec. 26, 1911.
2 SHEETS—SHEET 2.
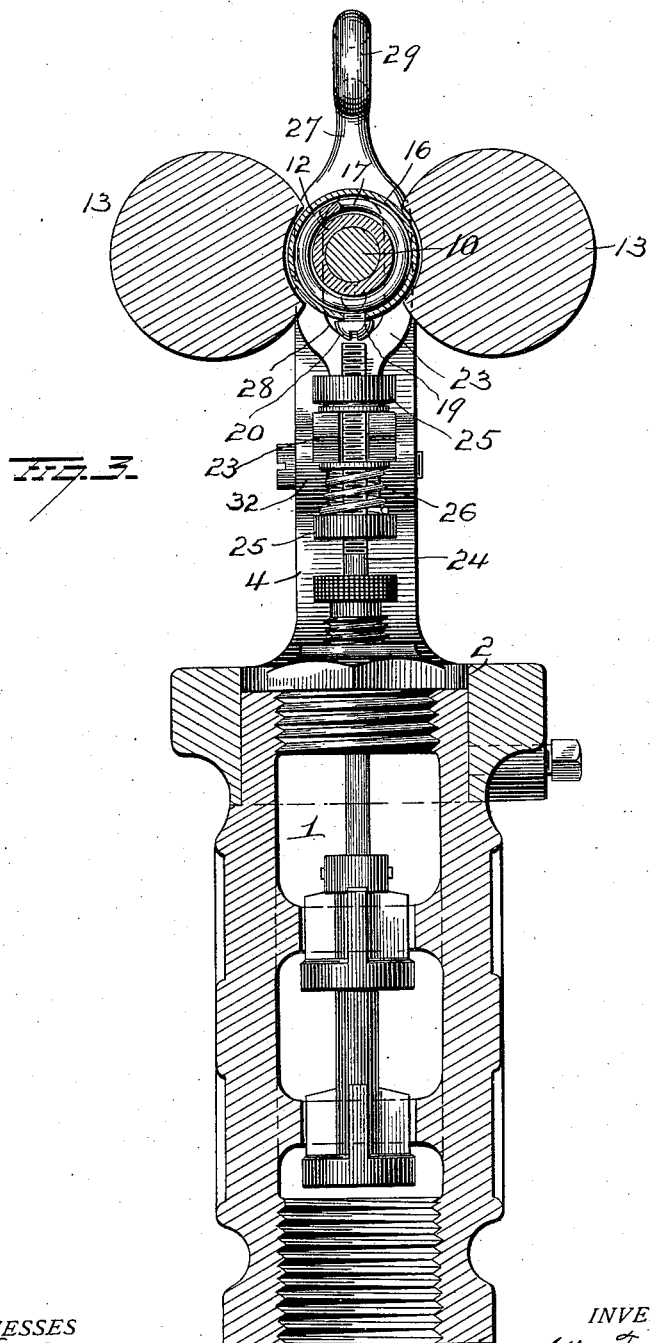
WITNESSES
INVENTOR
W. T. Davis
By H. A. Seymour
Attorney

UNITED STATES PATENT OFFICE.

WILLIAM T. DAVIS, OF COMSTOCK, MICHIGAN.

GOVERNOR FOR STEAM-ENGINES.

1,012,611.         Specification of Letters Patent.     Patented Dec. 26, 1911.

Application filed May 18, 1909. Serial No. 496,855.

*To all whom it may concern:*

Be it known that I, WILLIAM T. DAVIS, of Comstock, in the county of Kalamazoo and State of Michigan, have invented certain new and useful Improvements in Governors for Steam-Engines; and I do hereby declare the following to be a full, clear, and exact description of the invention, such as will enable others skilled in the art to which it appertains to make and use the same.

This invention relates to improvements in governors for steam engines,—one object of the invention being to so construct a governor that a lever connected with the valve stem can be operated automatically in accordance with the speed of the engine and so that it can also be operated manually to control the speed of the engine or to stop the same.

A further object is to compensate for lost motion between parts of the governor.

A further object is to provide simple and efficient means for adjusting the governing mechanism to control the speed by the extent of the opening of the valve.

With these and other objects in view the invention consists in certain novel features of construction and combinations of parts as hereinafter more fully described and pointed out in the claims.

In the accompanying drawings, Figure 1 is a side elevation of a governor embodying my improvements. Fig. 2 is a horizontal sectional view, and Fig. 3 is a vertical section.

1 represents a valve casing provided with suitable inlet and outlet ports and upon this casing a yoke or frame 2 is secured. The vertical arms 3—4 of the yoke or frame 2 are provided at their upper ends with bearings 5—6,—the bearing 5 being internally threaded for the reception of a tubular or socketed screw 7 provided at one end with a knob 8 and at the other end with a collar or enlargement 9. A horizontal shaft 10 is mounted in the bearing 6 of the yoke or frame 2 and also in the tubular or socketed screw 7,—said shaft 10 being adapted to be connected with the engine by means of any suitable gearing not shown.

A cross-head 11 having a tubular extension 12 is rigidly secured to the shaft 10 so as to rotate therewith and to the ends of this cross-head, weighted arms 13 are pivotally attached,—the inner end of said arms terminating adjacent to the tubular extension 12 of the cross-head 11 so as to be in position to engage a disk or collar 14 loosely mounted on said tubular extension. A sleeve 15 is mounted to slide on the shaft 10 and at one end this sleeve is provided with an enlargement 16 which forms a casing for a spring 17,—one end of said spring bearing against the disk or collar 14 and the other end against a collar 18 at one end of the tubular portion 12 on the cross-head 11. The casing or enlargement 16 on the sleeve 15 is provided with an elongated slot 19 for the passage of a screw 20 which enters the collar 18, said screw permitting longitudinal movement of the sleeve 15 but preventing the same from rotation independently of the shaft 10.

The arm 4 of the yoke or frame 2 is provided with an opening 21 and with lugs 22 at respective sides of said opening. Between these lugs a lever 23 is pivotally supported, the horizontal arm of said lever being bifurcated for the accommodation of the vertical valve stem 24. This valve stem is threaded for the reception of collars 25 disposed respectively above and below the horizontal arm of the lever and between said horizontal arm and one of the adjustable collars 25, a spring 26 is located to compensate for any lost motion which might occur between the connection of the lever 23 with the valve stem. The vertical arm 27 of the lever 23 is made with an opening 28 for the passage of the shaft 10 and said arm 27 projects a suitable distance above the shaft 10 and at its free end is provided with an eye 29 for the attachment of a suitable manually operated device which will permit the manipulation of the valve, through the medium of the lever 23, for manually controlling the speed of the engine or for stopping the same.

The vertical arm 27 of the lever 23 bears against a collar 30 loose on the shaft 10 and this collar may be provided with a pin 31 which enters the opening in said vertical arm 27. A washer of soft material, as indicated at 32, is preferably located between the collar 30 and one end of the sleeve 15. The lever 23 is provided with an outwardly projecting arm 33 which passes through the opening 21 in the arm 4 of the yoke or frame 2, and at its free end said arm 33 is bifurcated for the passage of a rod 34. This rod engages, at one end, lugs 35 on the yoke or frame 2 just under the bearing 6. The lower end of the rod 34 is provided with a knob 36 and between said knob and the bifurcated end of the arm 33 of the lever 23, a spring 37 encircles said rod. The knob 36 is threaded on the rod 34 so as to enable the adjustment of the tension of spring 37. The spring 37 operates to cause the vertical arm of the lever 23 to press in a direction toward the sleeve 15 and tend to move said sleeve and the governor connected therewith toward the inner head of the screw 7 which is mounted in the bearing 5 of the yoke or frame 2. The spring 37 thus operates to normally move the parts to their normal position and open the valve and it also serves to prevent lost motion between the lever 23 and the sleeve 15.

It will be seen that by adjusting the screw 7 the governor head and the sleeve 15 can be moved to adjust the throw of the lever 23 and thus regulate the extent of opening of the valve. When the screw 7 shall have been adjusted for the purpose above stated, it can be retained in such adjustment by means of a thumb screw passing through the bearing 5 and engaging said screw.

Having fully described my invention what I claim as new and desire to secure by Letters-Patent, is—

1. The combination with a valve, of a frame, a horizontally disposed governor shaft mounted for longitudinal adjustment, said shaft being shouldered at one end, a bearing for said shaft arranged to engage said shoulder, said bearing being threaded into said frame for adjustment whereby the shaft may be adjusted longitudinally by the adjustment of said bearing, a governor mounted on said shaft to be adjusted therewith, a valve actuating lever, and a governor actuated member arranged on said shaft to act on said lever.

2. The combination with a valve, of a frame, a governor shaft mounted for longitudinal adjustment, a screw constituting one bearing for said shaft, said screw being arranged to engage said shaft whereby the shaft is longitudinally adjusted by said screw, a governor mounted on said shaft to be adjusted therewith, a governor actuated member on said shaft, a valve lever on which said governor actuated member acts, and a tension spring for said valve lever.

3. The combination with a valve, of a frame, a governor shaft mounted for longitudinal adjustment, means for adjusting said shafts, a governor mounted on said shaft to be adjusted therewith, a governor actuated member on said shaft, a valve lever on which said governor actuated member acts, and a tension spring for said valve lever.

4. The combination with a valve, of a frame, a horizontally disposed shaft mounted in said frame for longitudinal adjustment, a governor carried by said shaft and adapted to be adjusted longitudinally therewith, a governor actuated sleeve mounted on said shaft, a valve actuating lever arranged to be acted upon by said sleeve, a tension spring for said lever, and means for adjusting said shaft longitudinally to adjust the governor relative to said lever.

5. The combination of a valve, the governor shaft mounted for longitudinal adjustment, a governor mounted on said shaft to be longitudinally adjusted therewith, an adjusting screw for said shaft, a governor actuated sleeve on said shaft, a valve actuating lever disposed to be actuated by said sleeve, and a spring for holding said lever yieldingly against said sleeve.

6. The combination with a valve, a yoke like frame, a horizontally disposed governor shaft mounted on said frame for longitudinal adjustment, a governor carried by said shaft and adapted to be adjusted therewith, a governor actuated sleeve mounted on said shaft for longitudinal movement thereon, a spring for said sleeve, means for adjusting the tension of said spring, a valve actuating lever, arranged to be acted upon by said sleeve, a spring for said lever and means for regulating the tension of said spring.

In testimony whereof, I have signed this specification in the presence of two subscribing witnesses.

WILLIAM T. DAVIS.

Witnesses:
 ELSIE BALDWIN,
 EULA B. MASON.

Copies of this patent may be obtained for five cents each, by addressing the "Commissioner of Patents, Washington, D. C."